United States Patent Office 3,236,681
Patented Feb. 22, 1966

3,236,681
EXPANDABLE POLYMER PARTICLES HAVING ANTI-ELECTROSTATIC PROPERTIES
Speros P. Nemphos and Raymond A. Barkhuff, Jr., Springfield, Mass., assignors to Monsanto Company, a corporation of Delaware
No Drawing. Filed Sept. 6, 1961, Ser. No. 136,214
6 Claims. (Cl. 117—100)

This invention relates to a particulate expandable thermoplastic polymer composition which does not accumulate electrostatic charges on the surfaces thereof and to a process for preparing such a particulate expandable thermoplastic polymer composition.

As is currently known, foamed thermoplastic materials are finding an increasingly wider application in various commercial and industrial applications. These foamed materials are generally prepared by either extruding or molding foamable thermoplastic polymer particles, sometimes called foamable beads. In some of the molding operations, it is desirable and sometimes feasible to first partially pre-expand the foamable beads before final foaming and molding thereof. The partial prefoaming provides particles which are considerably lighter than the foamable beads but yet are capable of further expansion to provide a molded article of extremely low density.

A major problem that confronts the manufacturer and converter of the foamable beads is the tendency with which the foamable beads accumulate electrostatic charges on the surfaces thereof due to friction or rubbing of the particles during processing and handling thereof. When these particles become electrostatically charged, they can cause serious handling problems since they tend to cling to the side walls of containers, hoppers, etc., thereby resulting in poor flow of the material. This problem is particularly more severe when the foamable beads are first partially foamed. Since these particles are lighter, the electrostatic charges accumulated on the surfaces thereof actually cause them to "pop" up into the air as well as to cling to the side walls of containers, hoppers, etc. Therefore, it is most desirable to have expandable thermoplastic polymer particles which will not have a tendency to accumulate electrostatic charges on the surfaces thereof even after partially pre-expanding the particles.

Therefore, an object of this invention is to provide a particulate expandable thermoplastic polymer composition which does not accumulate an electrostatic charge on the surface thereof.

Another object of this invention is to provide a process for preparing a particulate expandable thermoplastic polymer composition which does not accumulate an electrostatic charge on the surface thereof.

Briefly, the above and other objects of this invention are effectively attained by depositing onto the surfaces of expandable thermoplastic polymer particles, an anti-electrostatic agent which agent is comprised of a salt of an alkyl diacid phosphate and which corresponds to the formula:

$$X(RHPO_4)_n$$

In the above formula, X may be an ammonium, a substituted ammonium, an alkali metal, an alkaline earth metal or an earth metal group, "$n$" is a valence integer of 1–3 and R is an alkyl moiety containing 1–18 carbon atoms.

The following examples are set forth to illustrate more clearly this invention and are not intended to limit the scope thereof. Unless otherwise stated, all parts and percentages are by weight. The term expandable thermoplastic polymer particles as used herein refers to polymer particles having incorporated therein or associated therewith a volatile organic foaming agent and includes any particle shape or size capable of expansion upon the application of heat.

Example I

One hundred grams of expandable polystyrene particles are coated with a film of an aqueous solution, containing 10% of ammonium amyl hydrogen phosphate, by blending the particles with the aqueous solution. The solution employed herein has a pH of about 6.5. The particles are then dried at a temperature of about 70° C., and have coated thereon about 0.05% of ammonium amyl hydrogen phosphate. The dried particles are placed in a glass jar and vibrated for about 15–20 minutes on a laboratory mechanical vibrator. It is observed that none of the particles adhere to the inner wall of the glass container.

The particles are then transferred back and forth from one glass container to another approximately 12 times. Again, none of the particles adhere to the inner wall of the glass containers.

The particles are then prefoamed by passing them under an infrared heater. The prefoamed particles are again vibrated and transferred back and forth from one container to another in the same manner stated previously. The results are the same as obtained previously.

Since the particles do not adhere to the inner wall of the container this example illustrates that the particles do not have a tendency to accumulate electrostatic charges on the surfaces thereof even after extensive handling of both the foamable and prefoamed particles.

Example II

Example I is repeated with the exception that potassium amyl hydrogen phosphate is employed therein in place of the ammonium amyl hydrogen phosphate. The results obtained are similar to those of Example I.

Example III

Example I is repeated with the exception that sodium amyl hydrogen phosphate is employed therein in place of the ammonium amyl hydrogen phosphate. Analogous results are obtained.

Example IV

Example I is repeated with the exception that the salt formed between 1 mol of diethanolamine and 1 mol of amyl dihydrogen phosphate is employed therein in place of the ammonium amyl hydrogen phosphate. The results obtained are essentially the same as those obtained in Example I.

Example V

Example I is repeated except that the expandable polystyrene particles have 0.15% of ammonium amyl hydrogen phosphate coated thereon in the dry state by employing an aqueous solution containing about 15% of ammonium amyl hydrogen phosphate.

The results are comparable to Example I with the exception that cohesion of the expandable beads is noted, which cohesion is due to sticking of the individual particles. Although the particles do not adhere to the inner wall of the containers, the agglomerated particles do not break up even after extensive handling thereof.

Prefoaming of the particles does not break up the agglomerated particles. However, they still exhibit good flowability indicating that the particles are free of electrostatic charges.

Example VI

Example V is repeated except that the aqueous solution contains 15 parts of ammonium amyl hydrogen phosphate, 30 parts of sodium sulfate and 75 parts of water. The foamable particles have coated on the surfaces thereof in the dried state about 0.15% of ammonium amyl hydrogen phosphate and about 0.30% of sodium sulfate based in the weight of the foamable particles.

The results obtained, after extensive handling and pre-expansion thereof in the same manner as described in Example I show that the particles are free of both electrostatic charges and agglomerated clusters of particles. Thus, the sodium sulfate eliminates cohesion of the expandable particles and of the prefoamed particles.

*Example VII*

Example I is repeated except that ammonium stearyl hydrogen phosphate is employed therein in place of the ammonium amyl hydrogen phosphate. The results obtained are comparable to those reported in Example I.

The invention is directed to a particulate expandable thermoplastic polymer composition which does not have a tendency to accumulate an electrostatic charge on the surface thereof and to a process for preparing the particulate expandable thermoplastic polymer composition. The composition is comprised of expandable thermoplastic polymer particles having on the surfaces thereof an anti-electrostatic agent comprised of a salt of an alkyl diacid phosphate in an amount of at least 0.01 weight percent of the thermoplastic polymer particles. The salt of the alkyl diacid phosphate corresponds to the formula:

$$X(RHPO_4)_n$$

wherein X is selected from the group consisting of ammonium, substituted ammonium, alkali metal, alkaline earth metal and earth metal groups, "$n$" is a valence integer of 1–3 and R is an alkyl moiety having 1–18 carbon atoms. The process for preparing the said polymer particles consists of (a) coating the expandable thermoplastic polymer particles with a film of an aqueos solution containing the anti-electrostatic agent to be deposited on the surfaces thereof, and (b) drying the said coated polymer particles at a temperature below the foaming temperature of the expandable thermoplastic polymer particles. The aqueous solution containing the anti-electrostatic agent should have a pH value in the range of 5–9 and preferably about 6–8.

As stated previously, the salts of the alkyl diacide phosphate which can be employed in the practice of this invention can be either the ammonium, substituted ammonium, alkali metal, alkaline earth metal or earth metal salts of an alkyl diacid phosphate. The alkali metal, alkaline earth metal or earth metal salts of said alkyl diacid phosphate which can be employed in place of those shown in the examples are calcium, magnesium and aluminum alkyl mono-acid phosphates. The substituted ammonium compounds which can be employed in preparing the substituted ammonium salt of an alkyl diacid phosphate can be any substituted ammonium compound which will have a pH greater than 7 when dissolved in water. Typical examples of those substituted ammonium compounds which can be employed in place of the diethanolamine shown in Example IV are diisopropanolamine, ethanolamine and isopropanolamine. The preferred salt of an alkyl diacid phosphate to be employed in the practice of this invention is the ammonium amyl hydrogen phosphate.

In the practice of this invention, it is sometimes desirable to employ a sulfate salt with the anti-electrostatic agent. The purpose of the sulfate salt is to eliminate cohesion of the expandable particles which may possibly occur when an excessive amount of the anti-electrostatic agent is employed. The quantity of the sulfate salt to be used herein is dependent upon the quantity of the salt of an alkyl diacid phosphate coated onto the expandable thermoplastic polymer particles and is preferably employed in the ratio of 2–3 : 1 respectively. The sulfate salts which can be employed are the alkali metal and alklaine earth metal sulfates such as sodium sulfate, potassium sulfate, magnesium sulfate, calcium sulfate, etc. However, it has been generally found that when employing less than 0.10% of the salt of an alkyl diacid phosphate based on the weight of the expandable thermoplastic particles, cohesion or agglomerations of the particles is rarely encountered, and therefore the sulfate salt is not generally needed.

The thermoplastic polymers which can be employed in the practice of this invention are cellulose ethers and esters, e.g., ethyl cellulose, cellulose acetate, cellulose nitrate, cellulose butyrate; homopolymers and interpolymers of monomeric compounds containing the vinylidene group $$CH_2=C<$$

such as vinyl halides, e.g., vinyl chloride, vinyl bromide; vinylidene chloride; olefins, e.g., ethylene, propylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, methacrylic acid, acrylamide, methacrylamide, methacrylonitrile, acrylonitrile, acrylic acid and methacrylic acid esters of alcohols containing 1–18 carbon atoms such as methyl and ethyl methacrylate; vinylidene aromatic compounds, e.g., styrene, alpha-methylstyrene, vinyl toluene, p-ethylstyrene, 2,4-dimethylstyrene, o-chlorostyrene, 2,5-dichlorostyrene, vinyl naphthalene and interpolymers of vinylidene monomers of the above type with alpha,beta-unsaturated polycarboxylic acids and derivatives thereof, e.g., maleic anhydride, diethyl maleate, dibutyl fumurate, etc. It is feasible and in some cases desirable to employ blends of two or more thermoplastic materials such as blends of styrene polymers with rubbery diene polymers such as natural rubber, butadiene-styrene interpolymers, butadiene-acrylonitrile interpolymers and the like. Styrene graft copolymers prepared by polymerizing monomeric styrene, either alone or in admixture with other vinylidene monomers such as acrylonitrile, in the presence of a rubbery diene polymer may also be employed advantageously. The preferred polymers are styrene homopolymers and interpolymers of styrene containing at least 50 weight percent and preferably at least 70 weight percent of styrene and up to 50 weight percent and preferably up to 30 weight percent of at least one vinylidene monomer interpolymerizable therewith, e.g., butadiene, acrylonitrile, alpha-methyl-styrene and the like.

The foaming agent which can be employed with the thermoplastic polymer particles to provide expandable thermoplastic polymer particles is a volatile non-reactive organic compound having an atmospheric boiling point of less than about 80° C. with the preferred boiling point being in the range of about −10° C. to about 80° C. and having, at most, a slight solvent action on the thermoplastic polymer particles included in the compositions of this invention. Examples of volatile non-reactive organic compounds which can be employed as a foaming agent are the aliphatic hydrocarbons such as propane, butane, isobutane, pentane, hexane, isohexane, cyclohexane, etc.; certain halogenated aliphatic hydrocarbons such as ethyl chloride, propyl chloride, butyl chloride, isopropyl bromide and particularly the perchlorofluorocarbons such as dichlorodifluoromethane, monochlorotrifluoromethane, trichloromonofluoromethane, 1,1,2,2-tetrachloro - 1,2 - difluoroethane, and the corresponding perchlorofluorocarbons as set forth in U.S. 2,848,428; aliphatic amines such as ethylamine, propylamine, isopropylamine, butylamine, dimethylamine, diethylamine, etc.; aliphatic ethers such as diethyl ether, diisopropyl ether, methyl ethyl ether, ethyl isopropyl ether, etc.; acetaldehyde, etc. For a listing of other volatile organic foaming agents that can be employed see U.S. 2,681,321. The preferred foaming agent employed in the practice of this invention is n-pentane.

It is feasible and in some cases desirable to employ mixtures as the volatile organic foaming agent wherein the mixtures consist predominantly of a volatile nonreactive organic foaming agent of the type described above with minor amounts of an organic compound having a solvent action on the thermoplastic polymer particles included in the compositions of this invention. Typically, such mixtures will contain 70–99% by weight of the volatile non-reactive organic foaming agent and, correspondingly, 30–1% by weight of the organic compound having a solvent action on the thermoplastic polymer particles. Typical of the organic compounds having such a solvent action and which can be employed in admixture with a volatile non-reactive organic foaming agent are acetone, methylene chloride, styrene monomer, benzene, xylene, carbon tetrachloride, chloroform, etc. Preferably, the organic solvent should have a boiling point not higher than about 80° C.

The process of this invention is carried out by coating the expandable thermoplastic polymer particles with a film of an aqueous solution containing the anti-electrostatic agent which anti-electrostatic agent is comprised of a salt of an alkyl diacid phosphate. The coated particles are then dried at a temperature below the foaming temperature of the expandable thermoplastic polymer particles. For example, when employing expandable polystyrene particles the drying temperature should not exceed about 70° C.

The critical feature of this process is to deposit on the surfaces of the expandable polymer particles in the dried state at least 0.01% of the salt of an alkyl diacid phosphate based on the weight of the polymer particles with the preferred quantity being in the range of about 0.01% to about 0.1%. When it is desirable to have deposited thereon in the dried state an amount in excess of 0.10% of the salt of an alkyl diacid phosphate, it may then become necessary to incorporate a sulfate salt with the anti-electrostatic agent. The addition of the sulfate salt is dependent upon whether or not cohesion of the dried coated expandable polymer particles occurs. Even though cohesion may occur when the sulfate salt is not employed therein, the particles themselves are nevertheless free of electrostatic charges due to the anti-electrostatic agent being coated on the surfaces thereof.

The coating of an aqueous film of the composition described above on the polymer particles may be accomplished by spraying said particles with the aqueous solution of the composition or by dipping said particles in the aqueous solution or by employing any other known means of coating a film of an aqueous solution onto the surfaces of the polymer particles.

The advantage of this invention is found in the ability of the claimed composition to be free of electrostatic charges even though the expandable thermoplastic polymer particles are first prefoamed before final foaming thereof. Prefoaming of the composition of this invention does not reduce or destroy the effectiveness of the anti-electrostatic agent. Thus, the expandable thermoplastic polymer particles of this invention have good flowability which allows for ease of handling of the expandable thermoplastic polymer particles.

It will thus be seen that the objects set forth above among those made apparent from the preceding description, are efficiently attained, and since certain changes may be made in carrying out the above process and in the composition set forth without departing from the scope of the invention, it is intended that all matters contained in the above description shall be interpreted as illustrative and not in a limiting sense.

What is claimed is:

1. A composition comprised of expandable thermoplastic polymer particles having on the surfaces thereof an anti-electrostatic agent comprised of a salt of an alkyl diacid phosphate in an amount of at least 0.01 weight percent of the thermoplastic polymer particles; said salt of an alkyl diacid phosphate corresponding to the formula:

$$X(RHPO_4)_n$$

wherein X is selected from the group consisting of ammonium, substituted ammonium, alkali metal, alkaline earth metal and earth metal groups, "$n$" is a valence integer of 1–3 and R is an alkyl moiety containing 1–18 carbon atoms; said expandable thermoplastic polymer particles having associated therewith a volatile organic foaming agent having an atmospheric boiling point of less than about 80° C.

2. A composition as described in claim 1 wherein the salt of an alkyl diacid phosphate is present in an amount of 0.01–0.10 weight percent.

3. A composition as described in claim 1 wherein the salt of an alkyl diacid phosphate is ammonium amyl hydrogen phosphate.

4. A composition as described in claim 1 wherein the salt of an alkyl diacid phosphate is sodium stearyl hydrogen phosphate.

5. A composition as described in claim 1 wherein the anti-electrostatic agent has incorporated therewith a minor amount of a sulfate salt sufficient to prevent agglomerations of the expandable thermoplastic polymer particles; said sulfate salt being selected from the group consisting of the alkali metal and alkaline earth metal sulfates.

6. A composition as described in claim 5 wherein the salt of an alkyl diacid phosphate is ammonium amyl hydrogen phosphate and the sulfate salt is sodium sulfate.

References Cited by the Examiner

UNITED STATES PATENTS

| 2,318,296 | 3/1943 | Dickey | 117—139.5 |
| 2,676,122 | 4/1954 | McCarthy | 260—461.314 |
| 2,979,478 | 4/1961 | Melton et al. | 260—461.314 |
| 3,027,275 | 3/1962 | Park. | |

FOREIGN PATENTS 587,676   11/1959   Canada.

WILLIAM D. MARTIN, *Primary Examiner.*

RICHARD D. NEVIUS, *Examiner.*